Patented Jan. 17, 1933

1,894,750

UNITED STATES PATENT OFFICE

OSKAR BAUDISCH, OF MAFFERSDORF, CZECHOSLOVAKIA

GAMMA FERRIC OXIDE AND METHOD OF MAKING SAME

No Drawing. Application filed September 18, 1929, Serial No. 393,588, and in Germany May 17, 1929.

This invention relates to a new product, chemically pure ferric oxide ($Fe_2O_3$) of gamma configuration, and to a method of making the same.

In my work in association with L. A. Welo at the Rockefeller Institute in 1925, I discovered a ferric oxide having strong ferromagnetic properties and a characteristic X-ray spectrum which we termed the "active" ferric oxide, and which has been termed gamma ferric oxide to distinguish it from the ordinary paramagnetic ferric oxide which is termed the alpha form (Phil. Mag. 50, 399–408, 1925). The method of making gamma ferric oxide which is described in the paper cited was complicated and expensive, and it gave a product having a purity of not over ninety-five per cent.

By means of a method which I have since invented, I have succeeded in producing pure gamma ferric oxide. This product resembles that referred to in the paper above cited in X-ray spectrum and in magnetic properties, but differs from that product in that it is free from metallic and other impurities. The product has valuable therapeutic properties and is useful as a catalyst. For both these purposes, and particularly the former, the new product is far superior to the impure product heretofore produced.

My method of making chemically pure gamma ferric oxide consists in first preparing chemically pure gamma ferric oxide hydrate by the method described in my co-pending application, Serial No. 393,587, filed September 18, 1929, and then dehydrating that product by heating it to a temperature of from 150 to 280° C.

I cite the following as a specific example of my method:

Chemically pure iron prepared by known methods from ferro-pentacarbonyl is dissolved in a solution of pure hydrochloric acid of a concentration of from five to thirty-five per cent to form a ferrous chloride solution which is neutral to Congo paper. An excess of pyridine or aniline is added to the solution, and air is passed through the solution, causing a precipitation of gamma $Fe_2O_3H_2O$. The precipitate is dehydrated by heating it to a temperature of from 150 to 280° C. The time required for dehydration may vary, but the completion of the dehydration may easily be observed by placing a magnet near the product, since the original precipitate is not attracted to the magnet while the dehydrated product is strongly ferromagnetic.

What I claim is:

1. Ferromagnetic pure gamma ferric oxide adapted for the therapeutic uses prepared by dehydrating chemically pure gamma ferric oxide hydrate at a temperature of from 150 to 280° C.

2. The process of making chemically pure gamma ferric oxide, which consists in dehydrating chemically pure gamma ferric oxide hydrate by heating it to a temperature of from 150 to 280° C., until it becomes ferromagnetic.

3. A process for preparing gamma ferric oxide, which consists in precipitating gamma ferric oxide hydrate from a pure ferrous chloride solution with an organic base selected from the group consisting of pyridine and aniline in the presence of oxygen, and dehydrating the precipitate by heating it to a temperature of from 150 to 280° C.

4. A process for preparing gamma ferric oxide, which consists in dissolving pure iron obtained from ferro-pentacarbonyl in a solution of hydrochloric acid until the solution becomes neutral to Congo paper, adding an organic base selected from the group consisting of pyridine and aniline to the solution, passing oxygen through the solution to cause precipitation, and dehydrating the precipitate by heating it to a temperature of from 150 to 280° C. until it becomes ferromagnetic.

5. A process for preparing gamma ferric oxide, which consists in dissolving pure iron in a solution of hydrochloric acid until the solution becomes neutral to Congo paper, adding to the solution an organic base selected from the group consisting of pyridine and aniline, passing oxygen through the solution to cause precipitation, and dehydrating the precipitate by heating it to a temperature of from 150 to 280° C. until it becomes ferromagnetic.

In testimony whereof I have hereunto set my hand.

OSKAR BAUDISCH.

CERTIFICATE OF CORRECTION.

Patent No. 1,894,750.　　　　　　　　　　　　　　　　　　January 17, 1933.

OSKAR BAUDISCH.

It is hereby certified that error appears in the printed specification of the above numbered patent requiring correction as follows: Page 1, line 60, claim 1, strike out the word "the", and line 84, claim 4, strike out the words "to the solution" and insert the same after "adding" in line 82; and that the said Letters Patent should be read with these corrections therein that the same may conform to the record of the case in the Patent Office.

Signed and sealed this 28th day of February, A. D. 1933.

M. J. Moore,
Acting Commissioner of Patents.

(Seal)